March 26, 1963 J. S. MAYO 3,083,270

PULSE REPEATER MARGINAL TESTING SYSTEM

Filed Dec. 20, 1960 3 Sheets-Sheet 1

INVENTOR
J. S. MAYO
BY R. B. Ardis
ATTORNEY

INVENTOR
J. S. MAYO
BY R. B. Anderson
ATTORNEY

PULSE REPEATER MARGINAL TESTING SYSTEM

Filed Dec. 20, 1960 3 Sheets-Sheet 3

INVENTOR
J. S. MAYO
BY R. B. Anderson
ATTORNEY

United States Patent Office 3,083,270

Patented Mar. 26, 1963

3,083,270
PULSE REPEATER MARGINAL TESTING SYSTEM

John S. Mayo, Berkeley Heights, N.J., assignor to Bell Telephone Laboratories, Incorporated, New York, N.Y., a corporation of New York Filed Dec. 20, 1960, Ser. No. 77,192
10 Claims. (Cl. 179—175.31)

This invention relates to communication systems involving unattended repeaters and more particularly to means for locating a faulty or inoperative one of a plurality of unattended pulse regenerative repeaters which are serially distributed over a transmission path.

An object of this invention is to facilitate supervision of a repeatered pulse communication system.

More particularly, an object of this invention is to locate an inoperative or marginal pulse regenerative repeater by measurements from a terminal of the transmission path.

Since such repeaters are usually remote from the transmission path terminals and are sometimes accessible only with difficulty, it is a consequent object of this invention to restore more rapidly to normal operation a pulse communications system which has become inoperative due to the failure of a particular repeater.

The present invention is particularly, although in its broader aspects not exclusively, applicable to bipolar pulse code communication systems having one or more repeatered transmission paths. In accordance with a principal feature of typical bipolar code systems, a train of unipolar binary pulses (i.e., all ON pulses having the same polarity) is converted into a bipolar or quasi-ternary pulse train. Such a bipolar train characteristically has a direct-current component of greatly decreased magnitude. The bipolar system came into accepted use because of its ability to circumvent restoration problems in systems which utilize transformers and coupling capacitors along the transmission path and which, consequently, are unable to transmit the direct-current component of unipolar trains. The features and advantages of bipolar systems over unipolar systems along with an example of a typical unipolar to bipolar code converter are discussed in United States Patent 2,759,047, which issued August 14, 1956, to L. A. Meacham, and in United States Patent 2,996,578, which issued August 15, 1961, to F. T. Andrews, Jr. In the bipolar codes taught by the references above, oppositely poled pulses appear alternately to provide effective cancellation of the direct-current component of the pulse train.

As contemplated by the present invention, a test signal is transmitted along the transmission path whose operation it is desired to inspect. In accordance with a principal feature of the invention, this test signal is a pulse signal of the type normally transmitted over such a system with the exception that it does possess a direct-current component and an additional component at a frequency substantially less than the minimum pulse repetition frequency. The magnitude of the direct-current component is adjusted to affect the operation of the regenerative repeaters in a predetermined deleterious manner. The frequency of the additional component is adjusted in order to select a predetermined point along the transmission path at which it is desired to ascertain the accuracy of transmission.

A more complete understanding of the operation of the invention may be had by considering the following detailed description in conjunction with the attached drawings. In the drawings.

Figure 1:
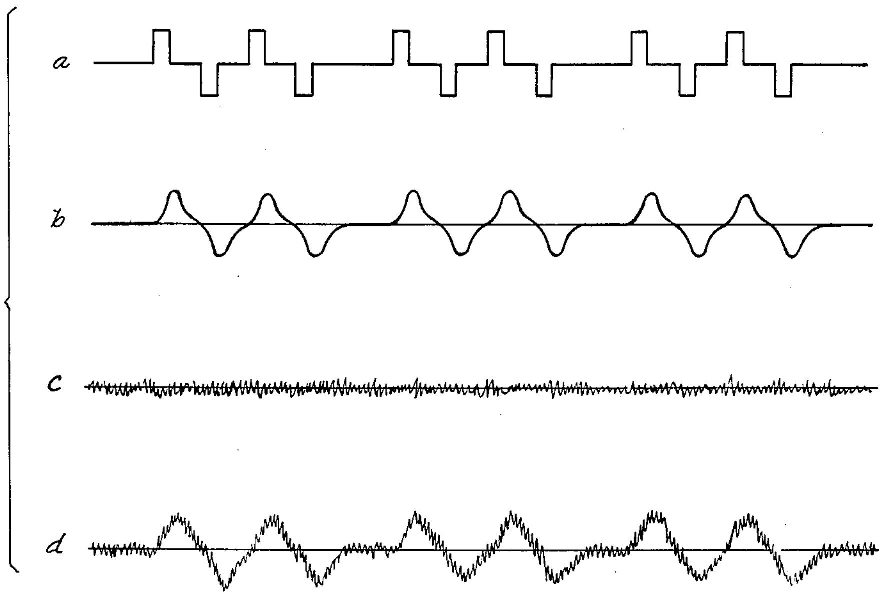
FIG. 1 illustrates several wave forms appearing at various points along a typical bipolar pulse transmission path.

In order to understand more clearly the operation of the invention it is first necessary to study a typical bipolar pulse transmission system. In FIG. 1, line *a*, of the drawing, is shown a typical wave form which might appear at the transmitting terminal of the transmission path or at the output terminal of a properly functioning repeater. Because of the transmission facility's increased attenuation to the high frequency components of this pulse train, the wave form appearing at the input of the next succeeding repeater is "smoothed" considerably. The effect of the frequency attenuation characteristics of a typical transmission line on a wave form of the type shown in line *a* of FIG. 1 is illustrated by line *b* of FIG. 1, which shows a typical wave form that might exist at the input of the next repeater. Besides the aberrations caused by the line characteristics, random noise or crosstalk of the type shown in line *c* of FIG. 1, may also be superimposed upon the signal. In consequence, a signal of the type shown in FIG. 1, line *d* may appear at the input of the next succeeding repeater.

Figure 2:
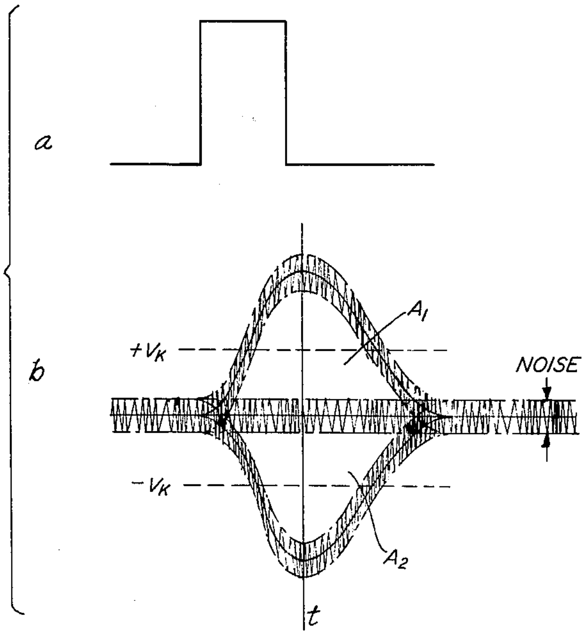
FIG. 2 illustrates the possible wave forms arriving at a typical repeater input.

The repeater then must analyze a highly distorted wave form of the type shown in line *d* of FIG. 1 and determine from this whether or not a pulse was transmitted at a particular instant. The difficulty of making a decision such as this is illustrated by FIG. 2. In FIG. 2, line *a* shows a square wave output pulse of the type which might have been sent over the transmission facility. Line *b* illustrates the combination of possibilities between which the repeater must make its decision. In essence, at a particular time, the repeater must decide whether a positive pulse, a negative pulse, or no pulse at all had been transmitted. The vertical line, *t*, designates the time at which the repeater makes its decision. In making this decision the repeater decides whether the input voltage is above the positive threshold $+V_k$, below $-V_k$, or somewhere between those two threshold values. Because the noise exists on the input terminals of the repeater regardless of whether a positive pulse, a negative pulse, or no pulse at all was transmitted, the intersection of the time line, *t*, with each of the two threshold lines, $+V_k$ and $-V_k$, must lies within the two areas, $A_1$ and $A_2$, respectively, in order to insure that the decision will be correctly made. The shape of these areas may also be affected by the leading or trailing edges of adjacent pulses, but, for our purposes, these and other additional factors need not be considered.

In accordance with a principal feature of the present invention, a test signal having a controllable direct-current content is transmitted over the transmission path causing the pulse train to be shifted with respect to the threshold values with a consequent deleterious effect on repeater accuracy. In a bipolar system this may be accomplished by superimposing upon those bipolar pulses necessary to clock the repeaters a variable number of unipolar pulses of the same polarity. It is necessary to transmit the direct-current content in pulsed form since a mere direct-current bias would not be transmittable beyond the first regenerative repeater. Since the usual transmission facilities utilize coupling capacitors and isolation transformers, the transmission path is unable to transmit the direct-current component of such a pulse train. The zero value of such a pulse train is, therefore, substantially identical to its average value rather than its "Off" value. If the added pulses are positive, the average value rises and the pulse train is shifted downward, away from the direction of the polarity of the additional unipolar pulses. This downward shift with respect to the threshold lines, $+V_k$ and $-V_k$, will cause errors of omission of the positive-going pulses and errors of commission of negative-going pulses.

Figure 3:
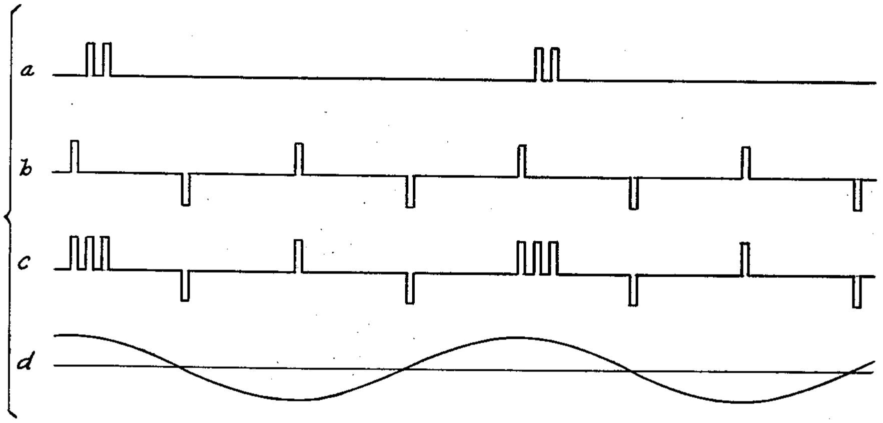
FIG. 3 illustrates the composition of a typical test signal for locating a faulty repeater in accordance with the invention.

FIG. 3 shows a typical, though simplified, test signal of the type contemplated by the invention. Line *a* of FIG. 3 illustrates a useful configuration of unipolar pulses which are necessary to provide the direct-current content described above, yet still be transmittable over the repeater line. FIG. 3, line *b*, shows a succession of pulses of alternating polarity. This bipolar train is often necessarily added to the test signal in order to clock the repeaters. FIG. 3, line *c*, illustrates the combination of the two aforementioned components of the test signal. FIG. 3, line *d*, illustrates the "identification tone" frequency component which results from the grouping of the unipolar pulses and which has a frequency equal to the group repetition rate of the unipolar groups. As will be seen later, this identification tone component is useful in ascertaining the accuracy of transmission at a particular point along the transmission line.

Figure 4:
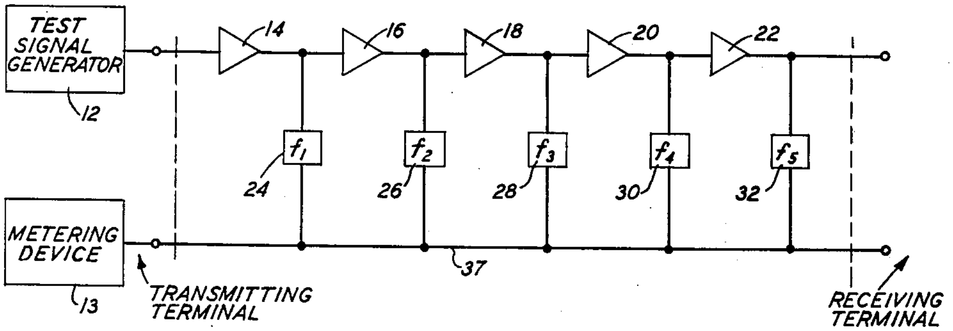
FIG. 4 illustrates a communications system employing the invention.

FIG. 4 illustrates a bipolar pulse communications system embodying the invention. At the transmitting terminal of the repeater line, a signal generator 12 of the type capable of generating a signal similar to that shown in line *c* of FIG. 3 is connected to the input terminals of the transmission facility. This transmission facility is equipped with repeaters 14, 16, 18, 20 and 22. Filter networks 24, 26, 28, 30 and 32 are connected respectively to the output of these repeaters. Each of these filter networks is responsive to a frequency indicative of the repeater to which it is connected. For instance, filtering means 24 is attached to the output of repeater 14 and is responsive to frequency $f_1$. As will be seen, this frequency, since it is unique to repeater 14, is useful in ascertaining the accuracy of transmission at the output of that particular repeater. Similarly, repeaters 26 through 32 are responsive to frequencies $f_2$ through $f_5$, respectively.

In carrying out the testing operation contemplated by the invention the test signal generator 12 is connected to the input of the transmission line. The repetition rate of the groups of unipolar pulses and, consequently, the frequency of the identification tone is then adjusted to be equal to the responsive frequency of that filter which is attached to the output of the most distant repeater. In beginning the test only a small number of pulses per unipolar group, for example only 1 or 2, are superimposed upon the clocking bipolar train. This results in a small increase in the direct-current component of the pulse train and also generates an additional "identification tone" frequency component at, in this case, frequency $f_5$. Assuming errorless transmission along the repeater transmission path, this pulse train appears in regenerated form at the output of repeater 22. Filtering means 32 which is responsive to frequency $f_5$ passes this identification tone component to the return transmission path 37. A metering device 13 connected at the transmitting terminal to the return transmission path 37 measures the magnitude of the identification tone.

Figure 5:
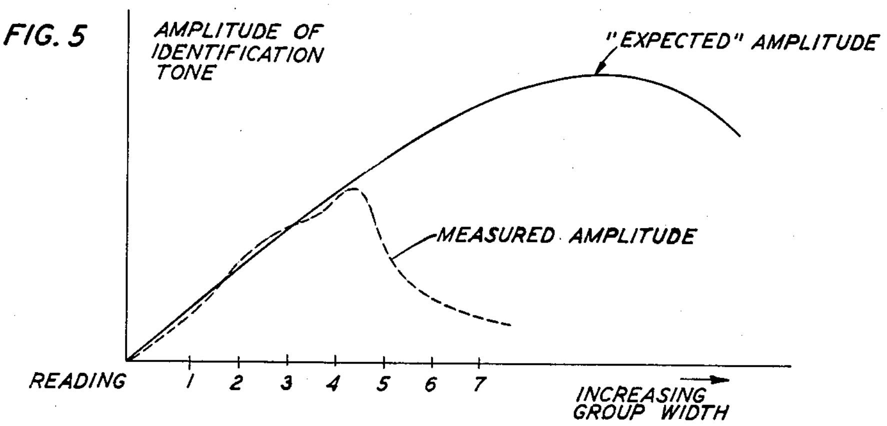
FIG. 5 illustrates a typical response of a pulse regenerative repeater to the changing direct current component of a test signal as contemplated by the invention.

The width of the unipolar groups, i.e., the number of unipolar pulses in each group, is then increased by a predetermined amount. This causes a further increase in the direct-current component of the pulse train. As shown in FIG. 5 this increase also results in a corresponding increase in the amplitude of the identification tone frequency component. For ease of operation, the expected increase in the amplitude of this component may be precalibrated on the metering device. The width of each group is increased further until the amplitude of the identification tone component departs substantially from its expected value, indicating errors in transmission. Such a result is illustrated in FIG. 5 upon making the 5th reading. As shown by FIG. 5, the amplitude of the derivative identification tone component fell considerably below its expected value.

In this case, it is quite possible that one would expect a magnitude of direct current such as this to be sufficiently large to shift the pulse train with respect to the intersection of the time line and the threshold value enough that errors would normally be caused. If this be the case, the entire transmission facility may be presumed to be acceptable.

If, however, errors are indicated at this most distant repeater when what is considered to be an unacceptably small direct-current component is transmitted as a portion of the test signal, an unknown one of the repeaters is then known to be marginal or inoperative. In order to locate that particular repeater which is faulty, the unipolar group repetition frequency may be altered to conform with a filter which is attached to a repeater closer to the transmitting end of the path. Having done this, it will again be necessary to increase the number of unipolar pulses in each group in steps to check the accuracy of transmission up to that point. If transmission is acceptably accurate to this point, the faulty repeater is known to be somewhere between the first and second check points. The group repetition frequency is consequently altered as many times as necessary to locate that particular repeater which has become marginal or inoperative.

Figure 6:
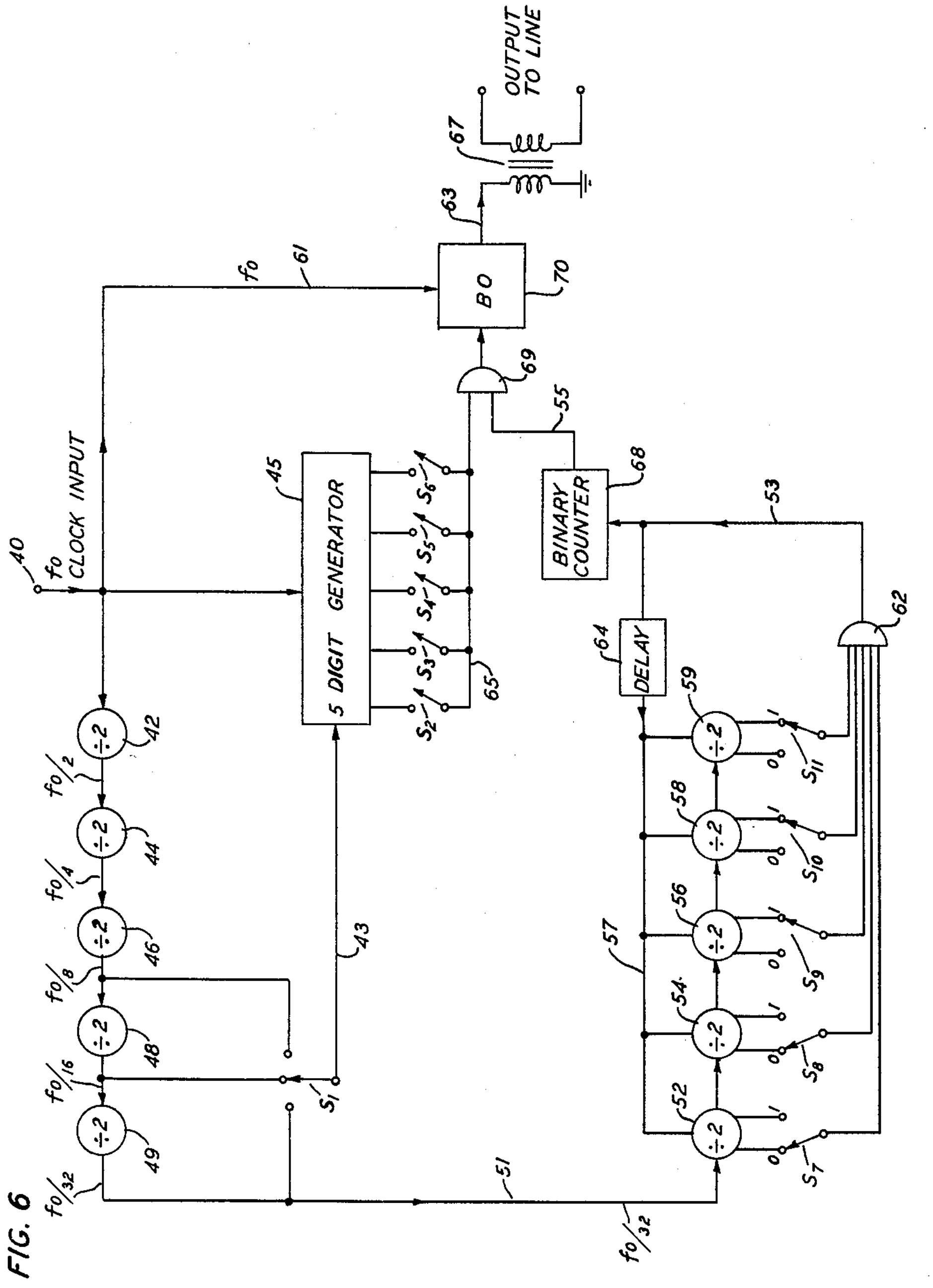
FIG. 6 is a schematic diagram of a test signal generator for producing pulse signals having a variable direct current component and a variable frequency "identification tone" component.

FIG. 6 of the drawing illustrates a pulse signal generator capable of producing a test signal in accordance with the invention. This is accomplished by first generating a unipolar pulse train of variable density, then gating this pulse train off and on at the identification tone frequency.

The variable density pulse train (that is, a pulse train having a variable number of ON pulses per unit time) is produced by first generating repetitious patterns of pulses. Each of these patterns is made up of $n$ consecutive unipolar ON pulses followed by $(M-n)$ OFF pulses. The quantity "$n$" may be 0, 1, 2, 3, 4, or 5. "M" may be 8, 16 or 32. The pulse density of the resulting pulse train, therefore, may be increased either by increasing "$n$" or decreasing "M."

As shown in FIG. 6, a clocking pulse train from terminal 40 is applied to the input of frequency divider 42. The frequency of the clocking pulse train is equal to $f_0$, the pulse repetition frequency normally used in the communication system. Frequency dividers 42, 44, 46, 48 and 49 are common devices which deliver an output pulse upon the application of every other input pulse. The frequency of the pulse train existing at the output of frequency divider 46 is therefore $f_{0/8}$, that of frequency divider 48, $f_{0/16}$, and that of frequency divider 49, $f_{0/32}$. Switch $s_1$ selects either the output of frequency divider 46, 48, or 49. As shown in the drawing, for instance, when switch $s_1$ is connected to the output of frequency divider 48, a pulse train having a frequency $f_{0/16}$ is delivered to the input of the 5 digit generator 45 by conductor 43. The 5 digit generator 45 is made up of serially connected stages, each stage being a single digit generator. The action of the 5 digit generator is such that if the first stage is triggered once, the remaining stages will successively trigger one another until the last stage is reached, when all action ceases. The 5 digit generator is synchronized by the clocking pulse train from terminal 40 such that the 5 output pulses are delivered at the pulse repetition rate, $f_0$. Switches $s_2$, $s_3$, $s_4$, $s_5$, and $s_6$ connect the 5 output conductors of the 5 digit generator to a common conductor, 65. Switch $s_1$, then, provides a means of selecting "M" while switches $s_2$ through $s_6$ provide means of selecting the desired value of "$n$." By properly setting these switches, the pulse density of the pulse train existing on conductor 65 may be varied in a wide variety of steps from a maximum density of 5/8 (that is, 5 out of 8 time slots being filled) to a minimum density of zero.

It is now necessary to provide means of gating this variable density pulse train on and off at the desired identification tone frequency. This is accomplished by first applying the pulse train existing at the output of frequency divider 49 to the input of bistable device 52 though conductor 51. Bistable devices 52, 54, 56, 58 and 59 are common binary counters which have been provided with 5 terminals: an input terminal, a reset terminal, the usual pair of bistable output terminals, and a third output terminal which transmits a pulse upon the arrival of every other input pulse. The inputs to the AND gate 62 are selectively connected to a desired one of the two bistable outputs by switches $s_7$, $s_8$, $s_9$, $s_{10}$, and $s_{11}$. The AND gate 62 provides an output to conductor 53 whenever all five of its inputs are energized simultaneously.

In order to understand the operation of this portion of the circuit, let us assume first that all five of the bistable devices are in their zero state, that is that they are all delivering an output to their "0" conductors. Upon the arrival of a pulse from conductor 51, bistable device 52 changes state such that an output is delivered to its "1" conductor. Upon the arrival of a second pulse, device 52 again delivers an output to its "0" conductor and also a pulse to the input of device 54 causing it to change state, thereby delivering an output to its "1" conductor. The inputs to the AND gate 62, therefore, will not be simultaneously energized until a number of pulses equivalent to the binary number selected by switches $s_7$ through $s_{11}$ (as in the case shown in FIG. 6, the binary number 00111 or 28) have arrived at the input of device 52. Calling this binary number "$k$," we see that an output is delivered from the AND gate 62 to conductor 53 which is a pulse train having a frequency of $f_{0/32k}$. When a pulse is delivered to conductor 53 it passes to conductor 57 after being delayed slightly by the delay network 64, and resetting the bistable devices to their original 00000 state so that the counting process may begin again. Delay network 62 is necessary in order to prevent premature resetting of the bistable devices. The pulse train from conductor 53 is also applied to the input of a binary counter 68. The output conductor 55 of the binary counter 68 is thereby turned off and on at $f_{0/32k}$, the frequency of the pulse train existing on conductor 53. Conductor 55, along with conductor 65 which carries the variable density pulse train, is applied to the input of AND gate 69. The output of AND gate 69 is then the desired variable density pulse train which has been gated off and on at the identification tone frequency. Blocking oscillator 70 provides an output to conductor 63 similar to the output from AND gate 69 except that it has been regenerated and re-synchronized with the clocking pulse train arriving on conductor 61. Transformer 67 is used to provide an output suitable for driving the repeatered line.

This test signal generator is highly flexible in that it will provide a wide range of direct current components by properly selecting the desired positions of switches $s_1$ through $s_6$ and similarly a wide range of identification tone frequencies by selecting the desired positions of switches $s_7$ through $s_{11}$.

It is to be understood that the testing operation and the test signal generator which have been described above are illustrative of the application of the principles of the invention. Numerous other arrangements of the testing facilities and procedures may be devised without departing from the true spirit and scope of the invention.

What is claimed is:

1. In combination with a quasi-ternary pulse communication system having a plurality of pulse regenerative devices connected along a transmission path, means for locating a device having inferior operating capabilities which comprises, in combination, means for transmitting a pulse type test signal over said transmission path, said test signal being characterized by recurrent groups of unipolar pulses, filtering means connected to the output of each of said regenerative devices, each of said filtering means being responsive to a unique frequency indicative of the regenerative device to which it is connected, means for adjusting the repetition frequency of said groups to coincide to that frequency to which a particular one of said filtering means is responsive, and means for adjusting the number of unipolar pulses in each of said groups whereby the operation of each of said regenerative devices is adversely affected.

2. In a pulse communication system having a plurality of repeaters connected at intervals along a first transmission path, said transmission path having a transmitting terminal and a receiving terminal, means for marginally checking the performance of a particular one of said repeaters which comprises, in combination, filtering means connected with each one of said repeaters responsive to a unique frequency indicative of the repeater to which it is connected, a second transmission path connecting each of said filtering means with said transmitting terminal, means at said transmitting terminal for transmitting a pulse type signal over said transmission path, said signal comprising a unipolar pulse train superimposed on a bipolar pulse train, said unipolar pulse train having at least a first component at zero frequency and a second component at a frequency substantially less than the minimum pulse repetition frequency of said unipolar pulse train, means for adjusting the frequency of said second component to substantially the same frequency as that to which the filtering means at the repeater under test is responsive, and means for adjusting the said first component such that the operation of each repeater is deleteriously affected.

3. Means for locating a faulty or inoperative one of a plurality of pulse regenerative repeaters serially connected along a transmission path which comprises means for generating a testing signal having a direct current component, said testing signal being comprised of recurrent groups of pulses having the same polarity, means for transmitting said groups of pulses over said transmission path, an auxiliary transmission path, filtering means connected between the output of each repeater and said auxiliary transmission path, each of said filtering means being responsive to a frequency unique to and indicative of the repeater to which it is connected, means for adjusting the frequency of repetition of said groups to substantial coincidence with that frequency to which a particular one of said filtering means is responsive, and means for measuring the magnitude of electrical energy being returned over said auxiliary transmission path.

4. In an arrangement for testing the operation of a particular one of a plurality of pulse regenerative devices serially connected along a first transmission path, means for transmitting a testing pulse train over said first transmission path, said pulse train comprising successive groups of pulses of the same polarity, said groups being recurrent at a preset repetition frequency, means for varying the number of pulses in each of said groups, a second transmission path, filtering means connected between the output of the particular device whose operation is being tested and said second transmission path, said filtering means being responsive to a frequency substantially identical to said repetition frequency, and means connected to said second transmission path for measuring the magnitude of electrical energy existing on said second transmission path.

5. In combination with a pulse communication system having a plurality of pulse regenerative repeaters connected at intervals along a first transmission path, means for locating a repeater having inferior operating capabilities which comprises, in combination, signal generating means for producing a testing signal comprising a train of ON and OFF pulses, said signal having a first frequency component at zero frequency and a second frequency component at frequency $f$, circuit means for applying said testing signal to the transmitting end of said first path, an auxiliary transmission path, a filter connected between the output of each of said repeaters and said auxiliary path, said filter being responsive to a frequency indicative of the repeater to whose output it is connected, means associated with said signal generating means for adjusting said frequency $f$ of said second component to substantial coincidence with that frequency to which a particular one of said filters is responsive, means for measuring the magnitude of electrical energy existing on said auxiliary path, and means associated with said signal generating means for varying the average number of ON pulses generated per unit time whereby the magnitude of said first component may be varied to deleteriously affect the operation of each of said repeaters.

6. In a pulse communication system provided with pulse regenerative repeaters distributed along a transmission path, said path having a transmitting end and a receiving end, apparatus for testing the operation of said transmission path which comprises, in combination, signal generating means for producing a testing signal comprising a train of ON and OFF pulses, said signal having a first frequency component at zero frequency and a second frequency component at frequency $f_1$, circuit means for applying said testing signal to the transmitting end of said path, means associated with said signal generating means for increasing the average number of ON pulses generated per unit time such that the magnitude of said first component is increased to deleteriously affect the operation of said repeaters, and means at the receiving end of said path for measuring the magnitude of electrical energy at frequency $f_1$ present within the signal received over said path.

7. In a pulse communication system having a plurality of pulse regenerative repeaters connected at intervals along a first transmission path, apparatus for testing the operation of a portion of said path which comprises, in combination, signal generating means for producing a testing signal comprising a train of ON and OFF pulses, said signal having a first frequency component at zero frequency and a second frequency component at frequency $f_1$, means for applying said signal to said first path, means associated with said signal generating means for increasing the average number of ON pulses generated per unit time whereby the magnitude of said first component is increased to deleteriously affect the operation of said repeaters, an auxiliary transmission path, filtering means connected between the output of a particular one of said repeaters and said auxiliary path, said filtering means being responsive to frequency $f_1$, and means connected to said auxiliary transmission path for measuring the magnitude of electrical energy existing thereon.

8. In a pulse communication system having a plurality of pulse regenerative repeaters connected at intervals along a first transmission path, apparatus for testing the operation of a portion of said path which comprises, in combination, a pulse generator for producing a first pulse train, said first pulse train comprising repetitious patterns of pulses, each of said patterns comprising $n$ ON pulses and $(M-n)$ OFF pulses, means for gating said first pulse train off and on at an identification tone frequency to form a second pulse train, said identification tone frequency being substantially lower than the frequency of repetition of said patterns, means for transmitting said second pulse train over said transmission path, means for measuring the magnitude of electrical energy at said identification tone frequency existing within the regenerated signal appearing at the output of a particular one of said regenerative repeaters, and means associated with said pulse generator for varying the average number of ON pulses per unit time in said first pulse train whereby the direct-current content of said second pulse train may be increased in increments to deleteriously affect the operation of each of said repeaters to a predetermined degree.

9. Apparatus of the type set forth in claim 8 characterized in that said means for varying the average number of ON pulses per unit time includes means for varying $n$.

10. In a pulse communication system provided with pulse regenerative repeaters, each of said repeaters having an input and an output and each accomplishing regeneration by comparing at particular instants of time the voltage at its input with a preset threshold voltage, each repeater transmitting an ON pulse from its output whenever at said particular instant of time the voltage at its input is greater than said threshold voltage and transmitting an OFF pulse whenever at said particular instant of time said voltage at its input is less than said threshold voltage, means to test the operation of each of said repeaters which comprises, in combination, means for transmitting a testing pulse train to the inputs of said pulse regenerative repeaters, said testing pulse train comprising successive groups of ON pulses, said groups being recurrent at a preset repetition frequency, means to vary the number of pulses in each of said groups, an auxiliary transmission path, filtering means connected between the output of each of said repeaters and said auxiliary transmission path, each of said filtering means being responsive to a frequency peculiar to and indicative of the repeater to which it is connected, means for adjusting the repetition frequency of said groups of ON pulses to coincide with the frequency to which a particular one of said filtering means is responsive, and means connected to said auxiliary transmission path for measuring the magnitude of electrical energy existing thereon.

References Cited in the file of this patent

UNITED STATES PATENTS

| | | |
|---|---|---|
| 2,208,417 | Gilbert | July 16, 1940 |
| 2,550,782 | Cooper et al. | May 1, 1951 |
| 2,791,687 | Mandel | May 7, 1957 |

FOREIGN PATENTS

| | | |
|---|---|---|
| 820,923 | Great Britain | Sept. 30, 1959 |